United States Patent
Plowman et al.

(10) Patent No.: US 9,916,675 B2
(45) Date of Patent: Mar. 13, 2018

(54) GRAPHICS PROCESSING SYSTEMS

(71) Applicant: ARM Limited, Cambridge (GB)

(72) Inventors: Edward Charles Plowman, Gamlingay (GB); Sean Tristram Ellis, Farnham (GB)

(73) Assignee: Arm Limited, Cambridge (GB)

( * ) Notice: Subject to any disclaimer, the term of this patent is extended or adjusted under 35 U.S.C. 154(b) by 716 days.

(21) Appl. No.: 13/907,562

(22) Filed: May 31, 2013

(65) Prior Publication Data
US 2014/0354671 A1    Dec. 4, 2014

(51) Int. Cl.
*G06T 15/40*   (2011.01)
*G06T 15/00*   (2011.01)
*G06T 11/40*   (2006.01)

(52) U.S. Cl.
CPC ............ *G06T 15/005* (2013.01); *G06T 11/40* (2013.01)

(58) Field of Classification Search
None
See application file for complete search history.

(56) References Cited

U.S. PATENT DOCUMENTS

| | | |
|---|---|---|
| 7,102,646 B1 | 9/2006 | Rubinstein et al. |
| 7,139,003 B1 * | 11/2006 | Kirk ............... G06F 9/3836 345/506 |
| 2006/0044603 A1 * | 3/2006 | Meeker ............. G06F 3/1215 358/1.15 |
| 2008/0012878 A1 * | 1/2008 | Nystad .............. G06T 11/001 345/613 |
| 2011/0148913 A1 | 6/2011 | Nystad et al. |
| 2014/0152650 A1 * | 6/2014 | Son .................. G06T 15/005 345/419 |

OTHER PUBLICATIONS

Search Report dated Dec. 4, 2014 in GB Patent Application No. GB1409581.4, 4 pages.
Examination Report dated Mar. 2, 2016, in GB Patent Application No. GB1409581.4.

* cited by examiner

*Primary Examiner* — Kyle Zhai
(74) *Attorney, Agent, or Firm* — Vierra Magen Marcus LLP (57) ABSTRACT

In a tile-based graphics processing system, when a tile for a render output is to be generated, the fragment data storage requirements for each fragment to be generated for the tile is determined 51, and a color and/or depth buffer in the tile buffer is allocated for use by the fragments for the tile based on the determination 57. The graphics processing pipeline then, when generating rendered fragment data for the tile, stores the rendered fragment data in the color buffer and/or depth buffer of the tile buffer allocated to the fragments for the tile 58.

22 Claims, 4 Drawing Sheets

GRAPHICS PROCESSING SYSTEMS

BACKGROUND

The technology described herein relates to the graphics processing systems, and in particular to tile-based graphics processing systems.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

As is known in the art, graphics processing systems and graphics processors are typically provided in the form of graphics processing pipelines which have multiple processing stages for performing the graphics processing functions, such as fetching input data, geometry processing, vertex shading, rasterisation, rendering, etc., necessary to generate the desired set of output graphics data (which may, e.g., represent all or part of a frame to be displayed).

The processing stages of the graphics processing pipeline may, e.g., be in the form of fixed-function units (hardware), or some or all of the functional units may be programmable (be provided by programmable circuitry that can be programmed to perform the desired operation). For example, a graphics processing pipeline may include programmable vertex and/or fragment shaders for performing desired vertex and/or fragment shading operations.

A tile-based graphics processing pipeline will also include a so-called tile buffer that stores rendered fragment data at the end of the pipeline until a given tile is completed and written out to an external memory, such as a frame buffer, for use. This local, pipeline memory is used to retain fragment data locally before the data is finally exported to external memory and is typically in the form of on-chip RAM that is set aside for this purpose.

In order to facilitate the writing back of rendered graphics data from the tile buffer to external memory, such as a frame buffer, a graphics processing pipeline will typically include write out circuitry coupled to the tile buffer pipeline memory for this purpose. The graphics processing pipeline may also be provided with fixed-function downsampling circuitry for downsampling the locally stored data before it is written out to external memory where that is required (as may, e.g., be the case where a frame to be displayed is rendered in a supersampled or multisampled manner for anti-aliasing purposes).

In conventional tile-based graphics processing pipelines, the tile buffer will typically store associated colour and depth buffers for storing one tile's worth of rendered fragment data. Two such sets of buffers may be provided, to allow a new tile to be started before the previous one has completely finished. However, notwithstanding this, the Applicants have recognised that there can still be situations where the graphics processing pipeline may need to be stalled because an appropriate colour buffer and depth buffer in the tile buffer is not available. This may be the case, for example, where a number of tiles only contain a small amount of geometry. This could be addressed by providing a tile buffer that can store more sets of colour and depth buffers, but this may not always be possible or desirable.

The Applicants believe therefore that there remains scope for improved mechanisms for providing tile buffer resources in tile-based graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

A first embodiment of the technology described herein comprises a tile-based graphics processing system comprising:
  a graphics processing pipeline comprising:
  a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
  a tile buffer configured to store rendered fragment data locally to the graphics processing pipeline prior to that data being written out to external memory, the tile buffer comprising one or more colour buffers and one or more depth buffers configured to store the colour data and depth data, respectively, of rendered fragments; and
  a write out stage configured to write data stored in the tile buffer to an external memory; and wherein:
  the graphics processing system is further configured to:
  determine the data storage requirements for fragments to be generated for a render output to be generated by the graphics processing system; and
  allocate a colour buffer and/or depth buffer in the tile buffer for use by the fragments based on the determination.

A second embodiment of the technology described herein comprises a method of operating a tile-based graphics processing system that comprises:
  a graphics processing pipeline comprising:
  a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
  a tile buffer configured to store rendered fragment data locally to the graphics processing pipeline prior to that data being written out to external memory, the tile buffer comprising one or more colour buffers and one or more depth buffers configured to store the colour data and depth data, respectively, of rendered fragments; and
  a write out stage configured to write data stored in the tile buffer to an external memory;
  the method comprising:
  when the graphics processing system is to generate a tile for a render output:
  determining the fragment data storage requirements for each fragment to be generated for the tile;
  allocating a colour and/or depth buffer in the tile buffer for use by the fragments for the tile based on the determination; and
  the graphics processing pipeline when generating rendered fragment data for the tile, storing the rendered fragment data in the colour buffer and/or depth buffer of the tile buffer allocated to the fragments for the tile.

The graphics processing system of the technology described herein operates to allocate the colour and/or depth buffers available in the tile buffer to fragments being rendered, based on the determined data storage requirements for the fragments. This provides a more flexible system that can allow, for example, a tile-based graphics processing pipeline to more efficiently schedule and process depth-only and colour-only fragments.

The Applicants have recognised that there can be situations when processing computer graphics where only the depth of objects in the scene is required (without regard to their colour), such as shadow mapping, and, conversely, where only the colour or a subset of the colour information is to be calculated (e.g. in luminance-only rendering for a "night vision" effect). Moreover, when depth-only rendering is being done, the colour buffer in the tile buffer on the chip will be unused and idle, and conversely, when colour-only rendering is done, the depth buffer will be idle.

The technology described herein exploits this recognition by allowing the allocation of the colour and/or depth buffers for use by fragments to be performed in use, based on the requirements of the fragments. Thus, for example, and as will be discussed further below, where depth-only rendering is being done, and thus the colour buffer would normally be unused, the technology described herein can recognise that situation and allocate the colour buffer for use as an additional depth buffer space (and conversely in the case of colour-only rendering). This then facilitates the provision of additional tile buffer space for use by fragments without the need to increase the overall tile buffer capacity, thereby allowing the throughput of the graphics processing pipeline to be increased where, for example, depth-only or colour-only rendering is being performed. This then facilitates more efficient use of the graphics processing pipeline's on-chip memory resources.

The rasteriser of the graphics processing pipeline will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should process the fragments generated by the rasteriser to generate rendered fragment data for all (covered) sampling points that the fragments represent, as is known in the art. These rendering processes may include, for example, fragment shading, blending, texture-mapping, etc. In an embodiment the renderer is in the form of or includes a programmable fragment shader.

The tile buffer comprises an allocated amount of memory that is set aside for this purpose. In an embodiment, it is all or part of a local, on-chip RAM of the graphics processing pipeline.

The colour and depth buffers will store data values for an array of sample positions, with respective sets of the sample positions corresponding to and being associated with respective pixels of an output data array that the rendered fragment data relates to. These sample values are usually, and in an embodiment are, grouped into sets of samples (such as groups of 2×2 sample values) that are each associated with a respective (e.g. display) pixel in the tile in question.

The colour buffer or each colour buffer in the tile buffer will be configured to store respective colour values (such as RGBA or RGB values) for an array of sample positions corresponding to a given tile. Similarly, the depth buffer or buffers in the tile buffer will be configured to store a respective set of depth values for the array of sample positions. There may be one or more than one colour buffer and one or more than one depth buffer. In an embodiment, the tile buffer comprises two colour buffers and one depth buffer.

The write out unit operates to write the data in the tile buffer (e.g. once the data for a tile in the tile buffer is complete) out to external (main) memory (e.g. to a frame buffer for a display), as is known in the art. The may include, as is known in the art, downsampling (averaging), either in a fixed or in a variable fashion, the sample values in the colour buffer to the final output (pixel) value to be written to the main memory (e.g. frame buffer) and/or other output, if desired.

The determination of the data storage requirements for the fragments, and the colour and depth buffer allocation process can be performed by any suitable stage or component of the graphics processing system. In an embodiment, the driver for the graphics processing pipeline performs the determination and tile buffer memory allocation. This is advantageous as the driver has access to all the information needed to determine the tile buffer memory requirements for the fragments being rendered, can generate any necessary data structure and commands to ensure that the memory allocations are used correctly, and, moreover, can do this transparently from the application's and the application programmer's perspective.

The fragment data that will be needed to be stored for a given render output can be determined as desired. It may be based, e.g. on the data to be rendered for the render output in question (e.g. whether it is colour or depth data or both), and any other parameters that could affect the type and amount of data to be stored.

In one embodiment, the type of data to be stored (e.g. whether it is colour-only or depth-only data) is considered. In an embodiment, the amount of data to be stored is also considered. This may be relevant, for example, where colour-only rendering, but with a more limited set of colour values, such as luminance-only rendering, is being performed (where only a subset of the colour information is to be generated and stored).

The allocation of the colour and/or depth buffers for storing the data for fragments for a tile of the render output can be performed as desired. In an embodiment, fragments can be allocated at least either a colour buffer or a depth buffer for their data (i.e. the colour buffer(s) and depth buffer(s) in the tile buffer can be allocated separately (and independently) to the fragments of respective, different tiles and/or render outputs to be generated). Thus in an embodiment, the fragments for a given tile and/or render output can be, and in an embodiment are, allocated either the colour buffer or the depth buffer for their use.

In an embodiment, portions of (some but not all of) a colour and/or depth buffer can be allocated to the fragments for a respective tile (render output). Thus, a colour buffer (e.g.) can in an embodiment be shared between two (or more) tiles being generated.

In an embodiment, this is possible for the colour buffer(s) at least. In this case, the colour buffer could be, and in an embodiment is, subdivided on the basis of the data channels (colour channels) that it supports. Thus, in an embodiment, the colour buffer resources can be allocated on a per-channel (e.g. R, G, B, and/or A channel) basis. This may be possible and desirable where the data for fragments for a given render output can be stored in the space for a single colour, such as in the case of luminance-only rendering. Other arrangements for subdividing the, e.g., colour buffer, not simply on a per-channel basis, would, of course, be possible.

Where the colour buffer, e.g., is subdivided, e.g. on a per-channel basis, it may then be, and in an embodiment is, where possible used to store the data for two (or more) tiles that are being rendered simultaneously (i.e. the colour buffer could be divided and allocated to two (or more) tiles simultaneously). This will further increase the throughput of the tile generation process.

In an embodiment, it is possible to store depth data into a colour buffer and vice-versa (i.e. the colour buffer can be assigned for use as a depth buffer (to store depth data) and vice-versa). This will then allow, for example, the colour buffer to be used as an additional depth buffer where depth-only rendering is being performed (such that even if the depth buffer is in use, the next tile for the depth-only rendering can be processed using the colour buffer as its "depth" buffer (i.e. as the buffer in the tile buffer where the relevant depth data will be stored)). This can be used, for example, to increase significantly the throughput of shadow maps and other depth-only rendering techniques.

Where necessary, the read and write data paths for the colour buffers can be multiplexed into the depth unit or units of the graphics processing pipeline, so that they can be used as and appear as additional addressable depth buffers for the depth test unit(s).

Where it is possible to assign a colour buffer to store depth values (as a depth buffer), then in an embodiment, that is only done in the event that a "true" depth buffer is not available in the tile buffer. This will ensure that the tile buffer memory allocation will favour the use of "real" depth buffers over colour buffers, thereby tending to avoid depth-only rendering jobs "hogging" the colour buffer(s) and blocking colour rendering unnecessarily.

The portion of the colour and/or depth buffer that is allocated to a given tile for a given render output should correspond to and be based on the amount of tile data it has been determined will need to be stored for the fragments for the render output in question. Each render output can have a different size (amount of buffer allocated) and/or format in the tile buffer, as required for the particular render output.

The graphics processing pipeline should store the rendered fragment data it generates in the appropriate buffer in the tile buffer. This can be achieved as desired, but in an embodiment each fragment being generated has state information associated with it that indicates the tile buffer region (e.g. the colour buffer or portion of the colour buffer, or depth buffer) that data for the fragment in question should be written to. The processing stages of the graphics processing pipeline can then use this state information to determine where to store the rendered fragment data for the fragment in question.

This state information is in an embodiment generated when determining the storage requirements for the fragments (e.g. by the driver). Thus in an embodiment the driver will, when a given tile and/or render output is to be generated, determine for each respective tile of that render output the form and amount of data that will need to be stored in the tile buffer for each fragment as the tile is rendered, and indicate that information in state information that is associated with the tile and/or render output and/or fragments in question.

This state information could be arranged and configured on a "global" basis, e.g. defined and set for a given render output to be generated and/or set of fragments to be rendered as a whole, or each individual fragment could have its own associated state information, as desired.

This state information in an embodiment indicates for the fragments, the buffer (and portion of that buffer, if appropriate) that it is to use in the tile buffer.

The state information can be configured as desired. In an embodiment, it indicates at least the amount of data space required in the tile buffer for storing the required rendered fragment data. This could, e.g., be simply a count of bits required, or, in an embodiment, an indication of which bits from the rendered fragment's output value must be stored.

In an embodiment, this state information comprises an allocation pattern (in an embodiment in the form of a "swizzle") that maps the individual channels from the fragment's output, e.g. colour, on to respective storage channels in the, e.g., colour buffer. This allocation pattern is in an embodiment also able to indicate whether an e.g., colour, channel in the, e.g., colour, buffer will be unused. (This latter will then make it more readily possible to determine which output channels in the tile buffer are required). In an embodiment each fragment for a given tile has the same allocation pattern.

In an embodiment, the tile buffer storage state information is included as part of the render state information for each fragment to be rendered.

(As is known in the art, to carry out the correct rendering operation, each stage of the rendering process needs to be configured appropriately, i.e. to be set to the correct so-called "rendering state". The rendering state determines how the stages of the rendering process operate on each fragment, and typically determines, for example, one or more of the antialiasing mode, blending mode, stencil buffer operation, texture function, texture map information, z-test mode, RGBa buffer write mode, etc., to be used for rendering the graphics fragments. It can also be used to, e.g., indicate the rasterising mode to be used. The rendering state is typically determined and set by the driver for the graphic processor and indicated by a set of "rendering state information".)

In an embodiment, the technology described herein further comprises, at the time a new tile is to be rendered (e.g. a new fragment for a new tile is to be rendered), comparing the determined resources (the tile data storage requirements) that are required for the tile in question to the available storage in the colour buffer or buffers and depth buffer or buffers in the tile buffer, and if sufficient capacity exists in the colour buffer or buffers and/or depth buffer or buffers, allocating capacity in one or more of those buffers to the tile in question, and then generating the tile for the render output using the allocated tile buffer resources. (On the other hand, if the necessary tile buffer resources are not available, processing of the new tile is in an embodiment stalled until appropriate tile buffer resources are available.)

This process in an embodiment compares the indicated data storage requirements for the fragments for the tile generated by the driver (and indicated in the, e.g., render state information) to the tile buffer resources currently in use (and/or available).

In this process, where fragments to be rendered for the tile have an associated allocation pattern, then it could be the case that if tile buffer resources corresponding to that allocation pattern are not available, the processing of the tile in question is stalled, or, alternatively, it could be considered whether the allocation pattern could be modified to match the available tile buffer resources, and in that case, the allocation pattern modified so as to match the available tile buffer resources (where that is possible), and the tile then processed accordingly.

Thus, in an embodiment, at the time a new tile is to be rendered, its tile buffer resource requirements are determined (in an embodiment using the allocation pattern indicated), compared with the available tile buffer resources, either statically using the allocation pattern specified by the driver, or dynamically by modifying the allocation pattern to match the available tile buffer resources, and if suitable free tile buffer resources are identified, the tile is then processed. The allocation pattern could, e.g., be determined accordingly to some packing rules, similarly to logical to physical register mapping in CPUs for dynamic register renaming.

Thus, in an embodiment, if it is determined that a tile for a given render output will not use all the available colour and depth buffer memory, it is determined whether a further tile for that render output (or for a different render output) can also be accommodated in the colour and depth buffers (in the tile buffer), and if so, the colour and depth buffers are apportioned accordingly, and the graphics processing pipeline is controlled to process both tiles into the tile buffer simultaneously. This can be done for more than two tiles where the colour and/or depth buffers can accommodate the required tile data. Thus the graphics processing pipeline can in an embodiment process multiple tiles and have multiple tiles "in flight" at the same time. This can then allow "resource-light" fragments and tiles (e.g. alpha-only or luminance-only tiles) to potentially start earlier in the presence of other resource-light render outputs, thereby increasing throughput.

In order to facilitate the operation of the technology described herein, in an embodiment, a record of the current allocation of the colour buffer and depth buffer resources in the tile buffer to tiles that are currently being processed (that are already "in flight") is maintained. This state information is in an embodiment stored with the associated tile state (as it should be immutable until all the rendering activity is complete for the tile).

This allocation record should correspond to the resolution that the colour and depth buffers can be allocated at. Thus, for example, it may simply indicate whether the colour buffer(s) and depth buffer(s) in the tile buffer are already in use (where the allocation is simply at the "buffer" level), or, where, e.g., the colour buffer can be apportioned at a finer resolution, e.g. on a per-channel basis, the allocation record should indicate for each respective potentially allocatable portion of the colour buffer (e.g. for each colour channel) whether that portion of the colour buffer is currently allocated to a tile being generated or not. In an embodiment, this allocation record is in the form of a bit vector that indicates which tile owns which buffer (or which portion of the buffer).

In an embodiment, respective allocation records are maintained for the colour buffer and depth buffer separately, as that facilitates allocating the colour and depth buffers to output tiles separately.

Other arrangements would, of course, be possible.

This colour and depth buffer "usage" record can then be compared with the indicated data storage requirements for new tiles and/or fragments to be processed, to determine if the processing of the new tiles and/or fragments can be started or not (as discussed above).

In addition to the specific processing stages mentioned above, the graphics processing pipeline may otherwise contain any suitable and desired processing stages that a graphics processing pipeline may contain, such as an early depth (or an early depth and stencil) tester; a late depth (or depth and stencil) tester; a blender; etc.

The technology described herein can be used for all forms of output that a graphics processing pipeline may be used to generate, such as frames for display, render-to-texture outputs, etc.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

Figure 1:
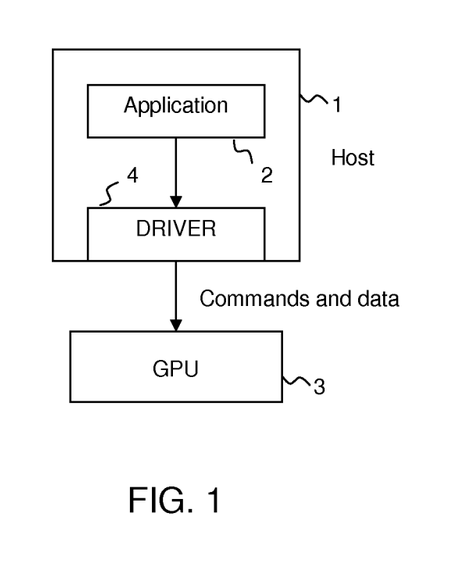
FIG. 1 shows an exemplary computer graphics processing system.

FIG. 1 shows a typical computer graphics processing system. An application 2, such as a game, executing on host processor 1 will require graphics processing operations to be performed by an associated graphics processor 3. To do this, the application will generate API calls that are interpreted by a driver 4 for the graphics processor 3 that is running on the host processor 1 to generate appropriate commands to the graphics processor 3 to generate the graphics output required by the application 2.

Figure 2:
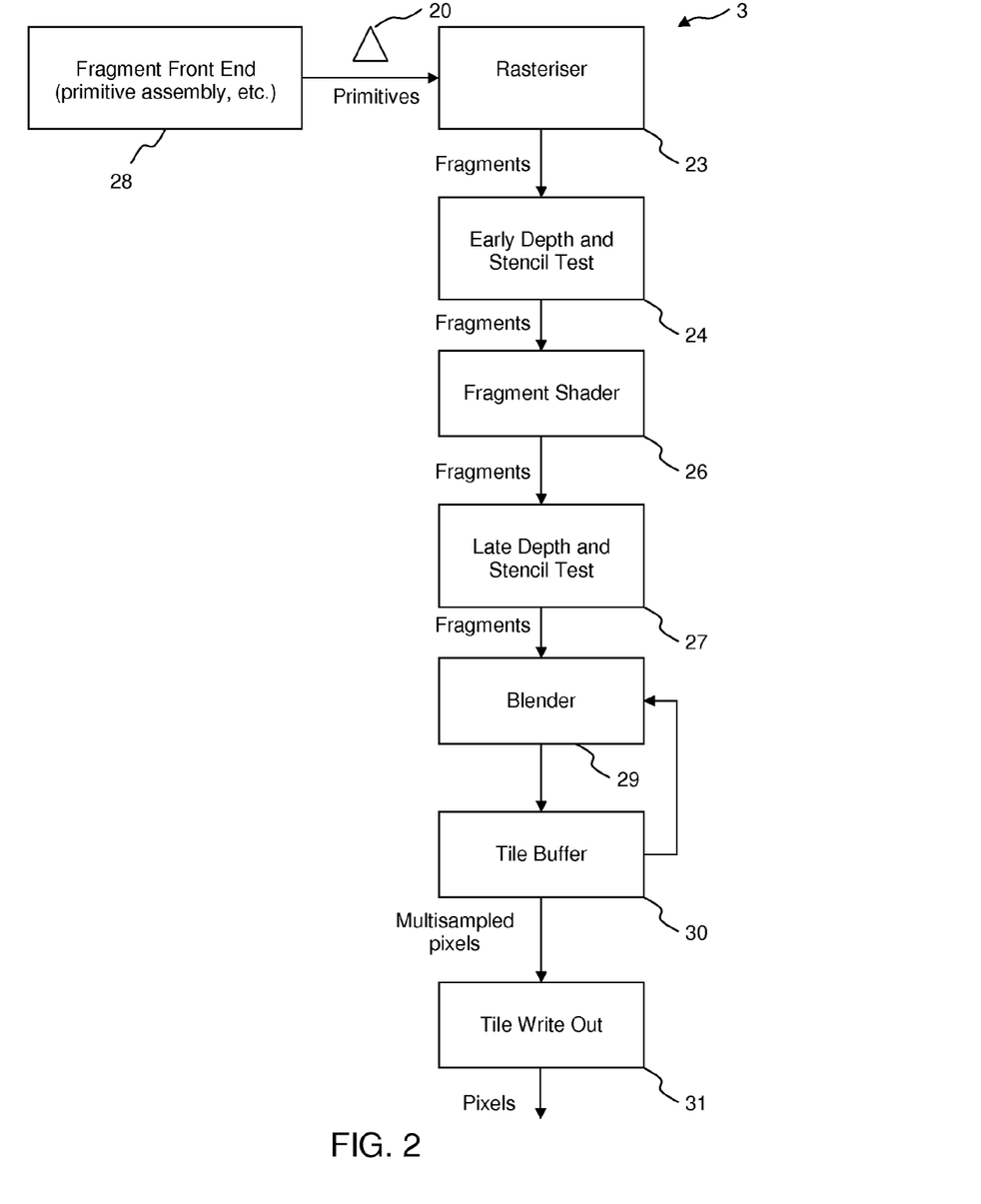
FIGS. 2 and 3 show schematically a graphics processing pipeline that can be operated in the manner of the technology described herein.

FIG. 2 shows the graphics processor 3 of the present embodiment in more detail.

The graphics processor 3 shown in FIG. 2 is a tile-based graphics processing pipeline and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

FIG. 2 shows schematically the pipeline stages after the graphics primitives (polygons) 20 for input to the rasterisation process have been generated. Thus, at this point the graphics data (the vertex data) has undergone fragment frontend operations 28, such as transformation and lighting operations (not shown), and a primitive set-up stage (not shown) to set-up the primitives to be rendered, in response to the commands and vertex data provided to the graphics processor, as is known in the art.

As shown in FIG. 2, this part of the graphics processing pipeline 3 includes a number of stages, including a rasterisation stage 23, an early Z (depth) and stencil test stage 24, a fragment shading stage 26, a late Z (depth) and stencil test stage 27, a blending stage 29, a tile buffer 30 and a downsampling and write out (multisample resolve) stage 31.

The rasterisation stage 23 of the graphics processing pipeline 3 operates, as is known in the art, to rasterise the primitives making up the render output (e.g. the image to be displayed) into individual graphics fragments for processing. To do this, the rasteriser 23 receives graphics primitives 20 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 24 performs, is known in the art, a Z (depth) test on fragments it receives from the rasteriser 23, to see if any fragments can be discarded (culled) at this stage. To do this, it compares the depth values of (associated with) fragments issuing from the rasteriser 23 with the depth values of fragments that have already been rendered (these depth values are stored in a depth (Z) buffer that is stored in the tile buffer 30) to determine whether the new fragments will be occluded by fragments that have already been rendered (or not). At the same time, an early stencil test is carried out.

Fragments that pass the fragment early Z and stencil test stage 24 are then sent to the fragment shading stage 26. The fragment shading stage 26 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 26 is in the form of a shader pipeline (a programmable fragment shader), but other arrangements, such as the use also or instead of fixed function fragment shading units would be possible, if desired.

There is then a "late" fragment Z and stencil test stage 27, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 26 with the depth values of fragments that have already been rendered (as stored in the depth buffer). This late fragment depth and stencil test stage 27 also carries out any necessary "late" alpha and/or stencil tests on the fragments.

The fragments that pass the late fragment test stage 27 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to a colour buffer in the tile buffer 30 from where they can, for example, be output to a frame buffer for display. The depth value for an output fragment is also written appropriately to a Z-buffer within the tile buffer 30. (The colour buffer and Z-buffer will store, as is known in the art, an appropriate colour, etc., or Z-value, respectively, for each sampling point that the buffers represent (in essence for each sampling point of a tile that is being processed).) The colour buffer and Z-buffer store, as is known in the art, an array of fragment data that represents part of the render output (e.g. image to be displayed).

In the present embodiment, the tile buffer 30 comprises an allocated portion of RAM that is located on (local to) the graphics processing pipeline (on-chip). The way that the colour and depth buffers in the tile buffer 30 are allocated to respective tiles when rendering in the present embodiment will be discussed in more detail below.

The, e.g. colour, data from the tile buffer 30 is input to a downsampling (multisample resolve) write out unit 31, and thence output (written back) to an output buffer, such as a frame buffer of a display device (not shown). (The display device could comprise, e.g., a display comprising an array of pixels, such as a computer monitor or a printer.)

The downsampling unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed).

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

Figure 3:
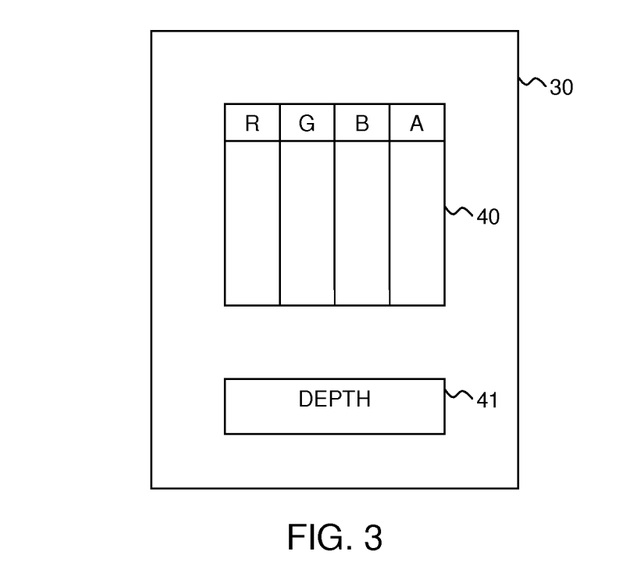

In the present embodiment, the tile buffer 30 consists of a colour buffer 40 configured to store four colour channels RGBA for an array of sample positions corresponding to a tile to be rendered, and a depth buffer 41 configured to store depth values for an array of sample positions corresponding to a tile to be rendered. FIG. 3 illustrates this.

In the present embodiment, when a new render output is to be generated, the driver 4 on the host processor 1 determines the data storage requirements of each fragment to be generated for the render output. This allows the driver 4 to flexibly allocate the available colour and depth buffer capacity in the tile buffer 30 on a tile and/or render output by render output basis.

To do this, the driver 4, when it receives commands to generate graphics output, uses the information from the application about the output to be generated, such as the data format for the render target, etc., to determine data that will need to be stored for the fragments for each tile in the tile buffer 30 and then allocates space within the colour buffer 40 and/or depth buffer 41 to the fragments for the tile accordingly.

The driver 4 also generates and associates with each fragment to be rendered for a tile, respective render state information that indicates, inter alia, the colour and/or depth buffer data storage requirements for the fragment in question.

The render state information is then provided to the graphics processing pipeline 3 along with the commands to generate the render output.

The graphics processing pipeline 3 then generates the render output, on a tile-by-tile basis in the manner discussed above, using the render state information to determine where and how to store the rendered fragment data for each tile in the tile buffer 30. The write out unit 31 correspondingly uses the render state information to determine where to write the rendered tile data out from the tile buffer 30 once each tile has been completed.

Figure 4:
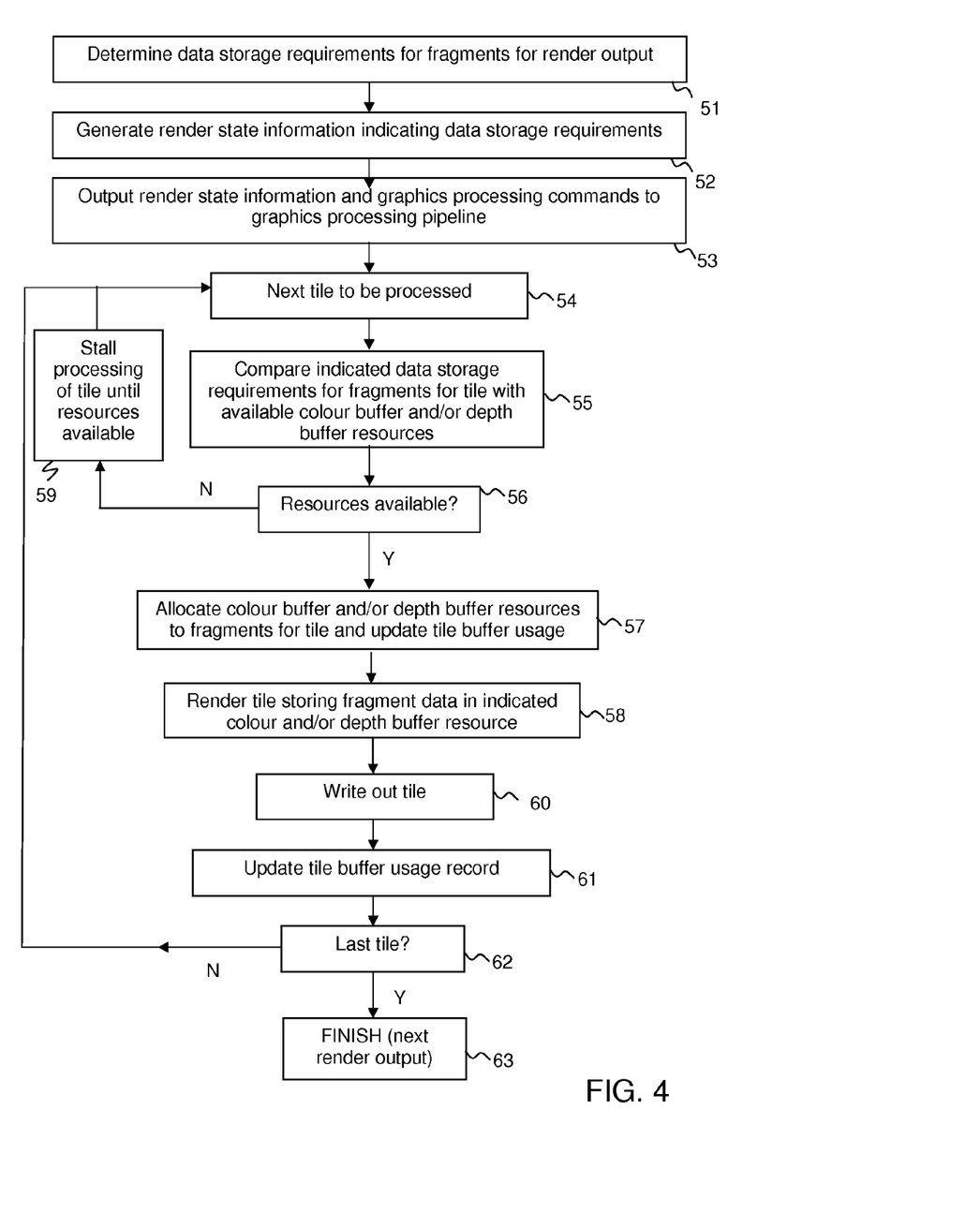
FIG. 4 shows schematically an embodiment of the operation of the graphics processing system of FIG. 1.

FIG. 4 is a flow chart illustrating these processes. As shown in FIG. 4, when a new render output is to be generated, the driver 4 for the graphics processing pipeline 3 first determines the tile buffer storage that will be required by the fragments to be generated for the render output in question (step 51).

Based on this, the driver 4 generates render state information for the fragments in question, that indicates the tile buffer storage requirements for the fragments (step 52). This render state information indicates the depth buffer and/or colour buffer and/or a respective channel or channels within the colour buffer to be used by (needed by) the fragments for the render output in question.

In the present embodiment this render state information indicating the data requirements for the fragments of the tile in question is in the form of a "swizzle" pattern which maps the individual channels from the fragment output onto respective data (storage) channels in the colour buffer, and/or depth buffer. The swizzle pattern also includes a coding to indicate whether a given colour channel is unused. (Other arrangements would, of course, be possible.)

The render state information and graphics processing commands and data to generate the render output are then sent to the graphics processing pipeline 3 (step 53).

When the graphics processing pipeline 3 is ready to process the fragments for a new tile (step 54), it uses the render state "swizzle" pattern associated with the fragments to determine the tile buffer resources the fragments for the tile will require, and compares that to the available colour buffer and depth buffer resources (in the present embodiment with the available colour buffer channels) using the "swizzle" pattern (step 55). The comparison could, e.g. be done, either by the driver, or by the use of a scheme similar to logical to physical resource mapping as in CPU register renaming.

If the appropriate colour channels are available in the colour buffer and/or depth buffer (step 56), colour and/or depth buffer resources are allocated for use for the fragments for the tile (step 57) and the graphics processing pipeline 3 proceeds to process the fragments and generate the output tile, storing the rendered fragment data in the indicated colour channel(s) (step 58). (If the required colour buffer channels are not available, the processing of the fragment and/or tile is stalled until the appropriate colour buffer channels become available (step 59)).

To facilitate this operation, the graphics processing pipeline 3 maintains a record of the current usage of the colour buffer channels and depth buffer, indicating which of the colour buffer channels and the depth buffer are being used by tiles that are currently being processed. This record is compared with the swizzle pattern for a new fragment and/or tile to be processed, to determine whether the appropriate colour and depth buffer resources are available or not (are currently in use or not). Once a new set of fragments using available colour buffer and/or depth buffer resources is started, the colour and depth buffer resources in question are marked as in use in the record until the tile in question is completed (step 57).

Once a given tile has been completed, it is written out to main (external) memory (step 60), the colour and depth buffer usage record is updated (step 61), and the process moves on to the next tile, and so on, until the final tile for the render output is completed (step 62). At this point, the next render output is generated (step 63), and so on.

The graphics processing pipeline will in this way generate successive tiles of the render output (target) in turn, storing the tile data appropriately in the tile buffer, and writing the desired render target data out to external memory, such as a frame buffer for a display (and for display).

In the present embodiment, the depth buffer 41 and colour buffer 40 can be allocated to respective tiles of a render output separately to each other, and, furthermore, the individual colour channels (RGBA) in the colour buffer 40 are also separately allocatable (i.e. the colour buffer can be apportioned on a per-data channel basis, and not just as a whole). Thus, where depth-only rendering is being performed, and the depth buffer is in use, a colour channel (e.g. the A-channel) of the colour buffer could be allocated to store depth values for a tile, for example.

Other arrangements, would, of course, be possible.

In the present embodiment, if it is determined that a tile for a given render output will not use all the tile buffer memory allocation, it is then determined whether a further tile can also be accommodated in the tile buffer and if so, the graphics processing pipeline is controlled to process both tiles into the tile buffer 30 simultaneously. This allows, for example, new tiles to be started whilst existing tiles are being processed, if each tile does not require the entire colour and/or depth buffer.

Thus, the allocation of the colour and depth buffers can, in the present embodiment, be configured as desired, so that, for example, the colour and depth buffers can be allocated independently and separately to respective tiles to be processed, and the colour buffer can store depth values and vice-versa.

Thus, where, for example, successive tiles only require a subset of the channels in the colour buffer for storing their data (e.g., such as could be the case when depth-only rendering, such as shadow mapping, is being performed), then the arrangement will operate such that successive tiles can store their depth values in respective different channels of the colour buffer, such that plural tiles can be processed simultaneously by using the colour buffer to store their respective depth values, rather than having to wait for the depth buffer to become free before each tile can be processed. This can therefore increase the processing throughput when performing, for example, depth-only rendering.

In this embodiment, a static allocation of the colour and depth buffer resources to fragments is performed, i.e. such that if the available resources do not match the swizzle pattern specified in the render state information, processing of the new tile is not commenced. It would also be possible to perform the allocation of the tile buffer resources on the graphics processing pipeline in a dynamic fashion, for example, by modifying the swizzle pattern in the render state information to match the available depth and/or colour buffer resources (e.g., colour channels) where sufficient, e.g., colour channels, are available in the colour buffer, but they do not match the swizzle pattern initially specified by the driver. This could be done, e.g., by use of a scheme similar to logical to physical resource mapping as in CPU register renaming (this could sit in the "load/store" pipeline writeback stage).

Of course, where "full" colour and depth value rendering is being performed, then the colour and depth buffers can be allocated to that render output in the normal manner. The operation in the manner of the present embodiment only takes effect where a more limited set of data is required to be stored for each fragment.

As will be appreciated from the above, the technology described herein, in its embodiments at least, comprises a system that can in particular provide more flexible use of the tile buffer in a tile-based graphics processing system, to, e.g. increase throughput when performing depth-only and/or colour-only rendering techniques.

This is achieved in embodiments of the technology described herein at least by allocating the colour and depth buffers to respective tiles to be generated on-the-fly (in use) based on an assessment of the actual memory requirements for the tiles in question.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto

What is claimed is:

1. A tile based graphics processing system comprising:
a graphics processing pipeline comprising:
a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
a tile buffer configured to store rendered fragment data locally to the graphics processing pipeline prior to that data being written out to external memory, the tile buffer comprising one or more colour buffers and one or more depth buffers configured to store colour data and depth data, respectively, of rendered fragments; and
a write out stage configured to write data stored in the tile buffer to an external memory; and wherein:
the graphics processing system is further configured to:
determine the fragment data storage requirements for fragments to be generated for a render output to be generated by the graphics processing system;
allocate a colour buffer and/or depth buffer in the tile buffer for use by the fragments based on the determination;
generate state information for the fragments that indicates the colour buffer or depth buffer that data for the fragment should be written to; and provide the state information to the graphics processing pipeline along with commands to generate the render output;

wherein if it is determined that a tile for a given render output will not use all of the available colour and depth buffer memory, the graphics processing system then determines whether a further tile for that render output or a different render output can also be accommodated in the colour and depth buffers, and if so, the colour and depth buffers are apportioned accordingly and the graphics processing pipeline processes both tiles into the tile buffer simultaneously.

2. The system of claim 1, wherein a driver for the graphics processing pipeline determines the data storage requirements for the fragments.

3. The system of claim 1, wherein the colour buffer and the depth buffer in the tile buffer can be allocated separately to fragments of respective, different tiles and/or render outputs to be generated.

4. The system of claim 1, wherein the colour buffer can be allocated to fragments on a per-colour channel basis.

5. The system of claim 1, wherein the colour buffer is used to store the fragment data for two or more tiles that are being rendered simultaneously.

6. The system of claim 1, wherein depth data for fragments is stored in a colour buffer.

7. The system of claim 1, wherein the state information comprises a swizzle allocation pattern that maps the individual channels from the fragment's output on to respective storage channels in the colour buffer.

8. The system of claim 1, wherein the system is further configured to, at the time a new tile is to be rendered, compare the determined data storage requirements for the fragments for the tile to the available storage in the colour buffer or buffers and depth buffer or buffers in the tile buffer, and if appropriate capacity exists in the colour buffer or buffers and/or depth buffer or buffers, allocate capacity in one or more of those buffers to the fragments for the tile in question, and then render the tile using the allocated colour and/or depth buffer resources.

9. The system of claim 8, wherein each fragment to be rendered has an associated swizzle allocation pattern that maps the individual channels from the fragment's output on to respective storage channels in the colour buffer, and wherein the system is further configured to modify the allocation pattern for a fragment to match the available colour and/or depth buffer resources.

10. The system of claim 1, wherein the system is further configured to maintain a record of the current allocation of the colour buffer and depth buffer resources in the tile buffer to tiles that are currently being processed.

11. A method of operating a tile based graphics processing system that comprises:
a graphics processing pipeline comprising:
a plurality of processing stages, including at least a rasteriser that rasterises input primitives to generate graphics fragments to be processed, each graphics fragment having one or more sampling points associated with it, and a renderer that processes fragments generated by rasteriser to generate rendered fragment data;
a tile buffer configured to store rendered fragment data locally to the graphics processing pipeline prior to that data being written out to external memory, the tile buffer comprising one or more colour buffers and one or more depth buffers configured to store the colour data and depth data, respectively, of rendered fragments; and
a write out stage configured to write data stored in the tile buffer to an external memory;
the method comprising:
when the graphics processing system is to generate a tile for a render output:
determining the fragment data storage requirements for each fragment to be generated for the tile;
allocating a colour and/or depth buffer in the tile buffer for use by the fragments for the tile based on the determination;
generating state information for the fragments that indicates the colour buffer or depth buffer that data for the fragments should be written to;
providing the state information to the graphics processing pipeline along with commands to generate the render output; and
the graphics processing pipeline when generating rendered fragment data for the tile, storing the rendered fragment data in the colour buffer and/or depth buffer of the tile buffer allocated to the fragments for the tile;
wherein if it is determined that a tile for a given render output will not use all of the available colour and depth buffer memory, the graphics processing system then determines whether a further tile for that render output or a different render output can also be accommodated in the colour and depth buffers, and if so, the colour and depth buffers are apportioned accordingly and the graphics processing pipeline processes both tiles into the tile buffer simultaneously.

12. The method of claim 11, wherein the driver for the graphics processing pipeline determines the data storage requirements for the fragments.

13. The method of claim 11, wherein the colour buffer and the depth buffer in the tile buffer can be allocated separately to fragments of respective, different tiles and/or render outputs to be generated.

14. The method of claim 11, wherein the colour buffer can be allocated to fragments on a per-colour channel basis.

15. The method of claim 11, wherein the colour buffer is used to store the fragment data for two or more tiles that are being rendered simultaneously.

16. The method of claim 11, wherein depth data for fragments is stored in a colour buffer.

17. The method of claim 11, comprising:
when a given render output is to be generated, determining a form and amount of data that will need to be stored in the tile buffer for each fragment as respective tiles of that render output are rendered, and indicating that information in state information that is associated with the fragments in question.

18. The method of claim 11, wherein the state information comprises a swizzle allocation pattern that maps the individual channels from a fragment's output on to respective storage channels in the colour buffer.

19. The method of claim 11, further comprising:
at the time a new tile is to be rendered, comparing the determined data storage requirements for the fragments for the tile to the available storage in the colour buffer or buffers and depth buffer or buffers in the tile buffer, and if appropriate capacity exists in the colour buffer or buffers and/or depth buffer or buffers, allocating capacity in one or more of those buffers to the fragments for the tile in question, and then rendering the tile using the allocated colour and/or depth buffer resources.

20. The method of claim 19, wherein each fragment to be rendered has an associated swizzle allocation pattern that maps the individual channels from the fragment's output on to respective storage channels in the colour buffer, and wherein the method further comprises modifying the allocation pattern for a fragment to match the available colour and/or depth buffer resources.

21. The method of claim 11, further comprising maintaining a record of the current allocation of the colour buffer and depth buffer resources in the tile buffer to tiles that are currently being processed.

22. A non-transitory computer readable storage medium storing computer software code which when executing on a processor performs a method of operating a tile based graphics processing system that comprises:
- a graphics processing pipeline comprising:
- a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
- a tile buffer configured to store rendered fragment data locally to the graphics processing pipeline prior to that data being written out to external memory, the tile buffer comprising one or more colour buffers and one or more depth buffers configured to store colour data and depth data, respectively, of rendered fragments; and
- a write out stage configured to write data stored in the tile buffer to an external memory;

the method comprising:
when the graphics processing system is to generate a tile for a render output:
determining the fragment data storage requirements for each fragment to be generated for the tile;
allocating a colour and/or depth buffer in the tile buffer for use by the fragments for the tile based on the determination;
generating state information for the fragments that indicates the colour buffer or depth buffer that data for the fragments should be written to;
providing the state information to the graphics processing pipeline along with commands to generate the render output; and
the graphics processing pipeline when generating rendered fragment data for the tile, storing the rendered fragment data in the colour buffer and/or depth buffer of the tile buffer allocated to the fragments for the tile;
wherein if it is determined that a tile for a given render output will not use all of the available colour and depth buffer memory, the graphics processing system then determines whether a further tile for that render output or a different render output can also be accommodated in the colour and depth buffers, and if so, the colour and depth buffers are apportioned accordingly and the graphics processing pipeline processes both tiles into the tile buffer simultaneously.

* * * * *